United States Patent [19]

Jones

[11] Patent Number: 5,314,148
[45] Date of Patent: May 24, 1994

[54] SPRING MOUNT FIXTURE HOUSING

[75] Inventor: Roy Jones, Whittier, Calif.

[73] Assignee: CSL Lighting, Inc., Valencia, Calif.

[21] Appl. No.: 991,111

[22] Filed: Dec. 16, 1992

[51] Int. Cl.⁵ .............................................. G12B 9/00
[52] U.S. Cl. .................................. 248/27.3; 248/343; 362/365; 362/366
[58] Field of Search .................. 248/906, 27.1, 27.3, 248/342, 343; 361/427, 422, 417, 419; 362/365, 366; 174/58; 220/3.6, 3.9

[56] References Cited

U.S. PATENT DOCUMENTS

| | | | |
|---|---|---|---|
| 1,400,155 | 12/1921 | Greenberg | 248/27.3 X |
| 2,441,215 | 5/1948 | Tyler | 248/27.3 X |
| 3,620,401 | 11/1971 | Lund | 220/3.6 |
| 4,250,540 | 2/1981 | Kristofek | 248/27.1 X |
| 4,293,895 | 10/1981 | Kristofek | 248/27.1 X |
| 4,673,149 | 6/1987 | Grote | 362/366 X |
| 4,733,339 | 3/1988 | Kelsall | 362/366 |

FOREIGN PATENT DOCUMENTS

| | | | |
|---|---|---|---|
| 223098 | 11/1957 | Australia | 362/365 |
| 1155126 | 6/1969 | United Kingdom | 362/365 |

Primary Examiner—J. Franklin Foss
Attorney, Agent, or Firm—Marvin H. Kleinberg

[57] ABSTRACT

A housing for mounting electrical fixtures behind surfaces such as walls and ceilings, includes a surface flange and a plurality of pairs of axially directed slots in the side wall. When inserted in a hole in a ceiling or wall until the housing flange is flush with the wall or ceiling surface, a pair of spring elements are compressed and inserted through a pair of slots which allow the springs to bear against the slot and interior surface of the ceiling or wall to hold the flange flush.

10 Claims, 2 Drawing Sheets

SPRING MOUNT FIXTURE HOUSING

SUMMARY

The present invention relates to a structural element and, more particularly, to a device for housing electrical connections and electrical lighting fixtures behind surfaces such as ceilings or walls.

People in the building trades have employed various methods of mounting electrical connections. Many have sought to combine the need for ease of insertion and removal in varied wall and ceiling thicknesses, along with the desired style and design elements. Where aesthetics were not of paramount importance, some have relied on external clamps and screws to create an adjustable mount adaptable to varying wall thickness such as are shown in the U.S. Pat. No. 3,710,972 to Barry, and U.S. Pat. No. 4,163,501 to Lass.

Others involve specially molded plastic electrical boxes which can be inserted into an opening without separate fasteners, but which are not easily removable nor adapted to multiple thicknesses. Typical boxes are shown in the U.S. Pat. No. 3,848,764, issued to Salg. Some devices allow for flush mounting, which is a highly desirable characteristic in meeting design criteria for the modern home or office, typified by Rardin, U.S. Pat. No. 4,226,393.

Virtually all of the prior designs required the use of some tools for insertion and mounting. Some even allowed for easy removal and reusability of both the housing and mounting elements as, for example, in U.S. Pat. No. 4,693,438 issued to Angell. Probably the best available choice in the prior art was a lighting fixture that could be flush mounted without tools as taught in the U.S. Pat. No. 3,620,401, issued to Lund. However, this device could not be adapted to multiple surface thicknesses, nor could it be removed and reused easily due to the use of nonretractable, gripping clamps.

According to the present invention, an improved mounting system enables housing for lighting fixtures to be mounted in walls and ceilings of varying thicknesses while maintaining the housing flush with the visible surface as is commonly desired for design aesthetic purposes.

The newer halogen lighting elements have, by virtue of increased brightness with smaller component elements, have, in many cases, drastically reduced the size of the fixture to be installed. The device of the instant invention addresses the need for use in a compact setting. The installation of the current invention can be done manually, without the need for tools or, if preferred, with simple, easily available tools, thus further addressing the need for compact installation. The present invention is especially useful in remodelling where the existing structure is modified to accept a new fixture, and where conventional housings, which are usually installed prior to the installation of the walls and ceilings, would be inappropriate.

According to the present invention, a housing is provided with a flange which engages a surface of a wall or ceiling into which the housing is to be installed. A plurality of pairs of axially directed slots are located at varying distances from the flange. A pair of spring elements are installed through one of the pairs of the slots, selected to be at a distance such that the springs, once inserted, bear against the slot and an interior surface of the wall, thereby holding the flange flush against the ceiling or wall's opposite, outer surface.

It is an object of the invention to provide a housing with mounting elements which engage the reverse side of a wall or ceiling and which are removable without damage to the wall or ceiling so that fixtures mounted within the housing may be replaced as style or necessity dictate. Lighting design is particular to individuals, and personal tastes often alter with time. The ability to easily change the fixture within the housing is an important convenience feature not present in prior devices.

More particularly, it is an object of the invention to provide an otherwise conventional housing with a plurality of axial slots into which spring-like elements may be inserted for engagement with the reverse side of a wall or ceiling to retain the housing flush with the opening over a range of common wall and ceiling thicknesses. The range of positions for the spring-like elements positions is very practical. It accommodates persons desirous of acquiring matching or coordinating fixtures within the housing to maintain a decor or style throughout several rooms. In areas where older structures have had various additions at different times, the walls and ceilings may be of different thicknesses. The alternative slots with the spring elements provide the flexibility to adapt to the variable thicknesses while allowing the style and coordination to be maintained.

Additional objects and advantages will become apparent from the drawings and the following brief description thereof.

DETAILED DESCRIPTION OF THE DRAWINGS

Figure 1:
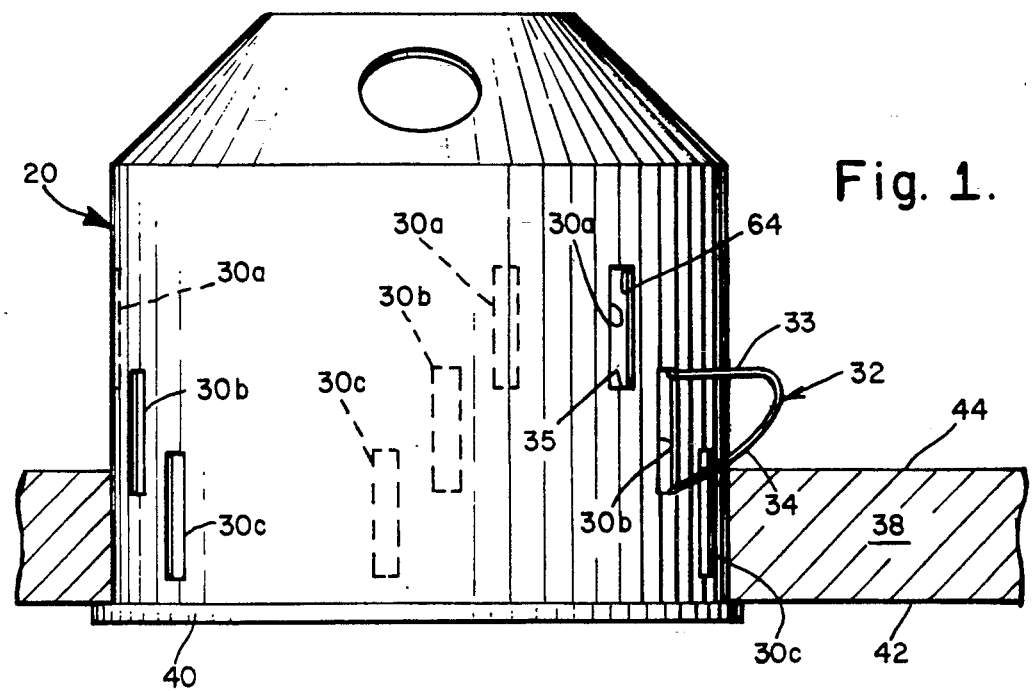
FIG. 1 is a side view of a housing according to the present invention.

Turning first to FIG. 1, there is shown an electrical housing 20 intended for flush mounting according to the present invention. The housing 20 has pairs or groupings of slots 30a, 30b and 30c at various levels with one, two or more slots at the same level. Substantially "u" or "v" shaped spring elements 32 are inserted into the slots 30 with one arm 33 bearing on the slot housing 30 and the other 34 adapted to bear on the reverse side of the mounting surface.

Figure 2:
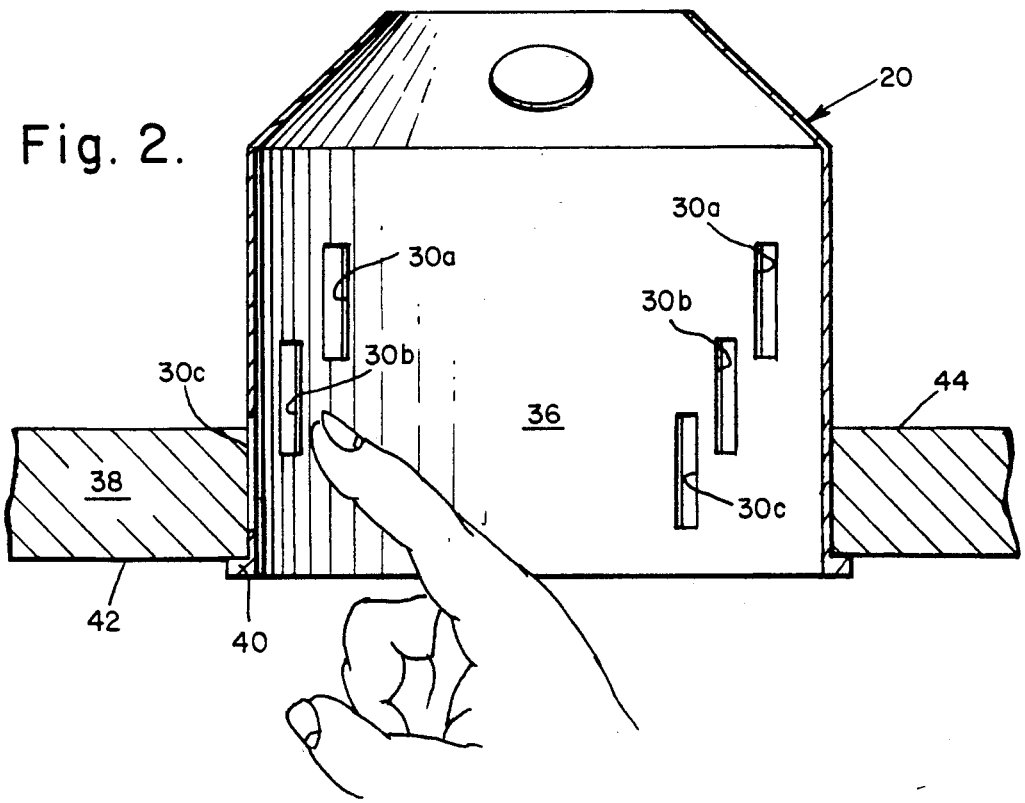
FIG. 2 is a sketch illustrating the selection of a slot once the housing of FIG. 1 has been inserted into the ceiling.

FIG. 2 shows the housing of FIG. 1 inserted into an opening 36 cut into a ceiling 38 or wall until a housing flange 40 fits flush against the wall or ceiling 38 outer surface 42. The slot 30b whose lower end 35 is closest to the inner surface 44 of the ceiling 38 can be identified by the touch of a finger.

Figure 3:
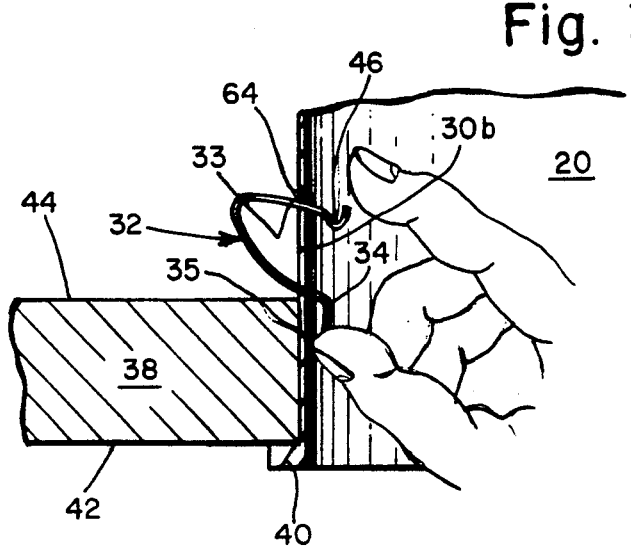
FIG. 3 is a detailed view of the spring element being compressed as it is being inserted into the slot in the housing of FIG. 1.

Next, as shown in FIG. 3, the spring element 32 compressed and inserted through the slots 30b which most nearly correspond to the thickness of the ceiling 38 or wall. The slot 30b whose bottom edge 35 is closest to the inner surface 44 of the ceiling or wall 38 receives the spring element 32 which is pushed until the arms of the spring 33,34 snap into place, thus capturing the top edge of the housing slot 30b in a "v" portion 46 or notch of the spring member 32. The spring member 32 acts upon the top 64 of the housing slot 30b and the inner surface 44 of the ceiling or wall layer to keep the housing flange 40 flush against the outer ceiling 42 or wall surface, thereby effectively mounting the fixture 20.

FIG. 3 shows a spring 32 being compressed and inserted into an intermediate slots of the housing 20 already inserted into an opening in a wall or ceiling such that the flange 40 is flush against the outer surface 42. The notch or "v" portion 46 of the spring 32 will, once the spring is fully inserted and released from compression, snap into place, capturing the top edge 64 of the slot 30b.

Figure 4:
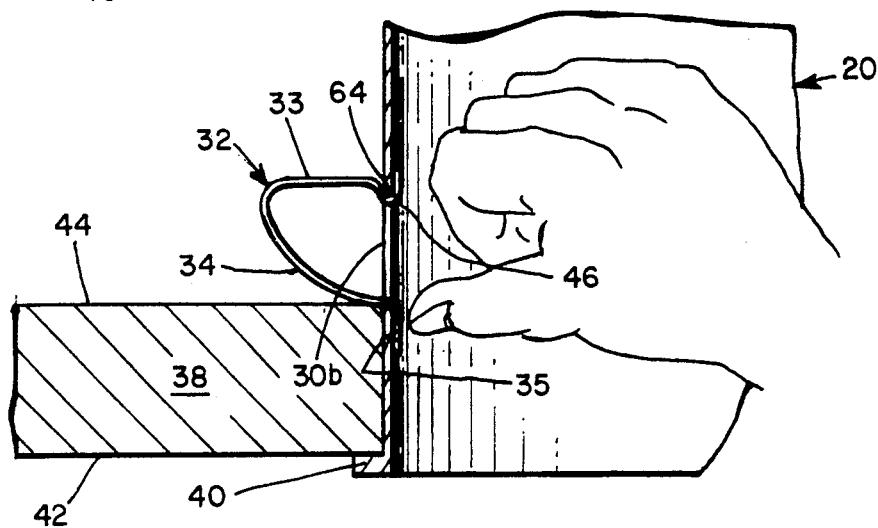
FIG. 4 shows the housing of FIGS. 1 and 3 where the spring element of FIG. 3 is being pushed into a completely inserted position.

FIG. 4 shows a lateral force being applied to fully insert the spring element 32. Once in place the bottom portion 34 of the spring presses against the inner surface 44 of the wall or ceiling 38 to keep the housing flange flush as described above.

Figure 5:
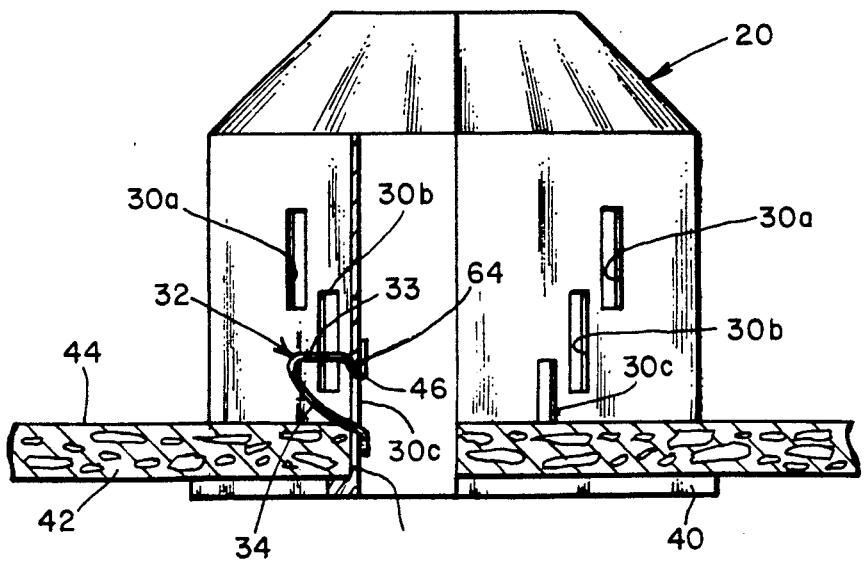
FIG. 5 shows the housing of FIG. 1 completely installed with the spring element fully inserted and the flange flush with the ceiling.

FIG. 5 shows a similar installation with a thinner wall or ceiling 38'. As shown, the spring 32 is inserted in the lowermost slot 30c of the fixture.

Although a cylindrical housing 20 has been shown, the invention is equally applicable to square and other shaped housings. Moreover, it is possible to accomplish the mounting described herein with as few as one spring for a small, lightweight housing on a vertical wall. Conversely, a plurality of slots and spring elements may be required to maintain the flange flush against the ceiling or wall where the shape or weight of the housing and the fixture mounted therein or other factors so dictate.

What is claimed as new is:

1. A housing for installing electrical fixtures in a structural wall comprising:
   a) a housing body having a longitudinal axis for mounting in an opening in the wall;
   b) a peripheral flange about the mouth of said housing body;
   c) at least one group of axially directed slots in said housing body and each slot being located at a different axial distance from said housing body mouth, each corresponding to a different anticipated wall thickness; and
   d) at least one spring element having opposed extended arms and adapted, when compressed, to be inserted into one of said slots, of said group said opposed spring element arms, when expanded, adapted to bear on the housing body and on an inner surface of the wall, whereby the expanded spring exerts a force on the housing to hold said flange flush against the outer surface of the wall.

2. The housing, as in claim 1, further including a second group of slots, each slot of said second group being axially aligned with a corresponding slot of one group of slots and including a second spring element adapted to be inserted in one of said second group of slots.

3. The housing as in claim 1, wherein said housing is rectilinear.

4. The housing, as in claim 1, wherein a single said spring element is sufficient to hold said peripheral flange flush against a wall.

5. The housing, as in claim 2, wherein said housing is cylindrical.

6. The housing, as in claim 5, wherein a third group of slots are provided and a third spring element holds said housing against the wall.

7. The housing, as in claim 3, wherein a third group of slots are provided and a third spring element holds said housing against the wall.

8. A housing for installing electrical fixtures in a ceiling element comprising:
   a) a housing body having a longitudinal axis for mounting in an opening in the ceiling;
   b) a peripheral flange about the mouth of said housing body;
   c) at least one group of axially directed slots in said housing body and each slot being located at a different axial distance from said housing body mouth, each corresponding to a different anticipated ceiling thickness; and
   d) at least one spring element having opposed extended arms and adapted, when compressed, to be inserted into said slots, said opposed spring element arms, when expanded, adapted to bear on the housing body and on an inner surface of the ceiling, whereby the expanded spring exerts a force on the housing to hold said flange flush against the outer surface of the ceiling.

9. The housing, as in claim 8, further including a second group of slots, each slot of a second group being axially aligned with a corresponding slot of said one group of slots and including a second spring element adapted to be inserted in one of said second group of slots.

10. The housing, as in claim 8, where said housing is rectilinear.

* * * * *